Oct. 2, 1951  C. RAMME  2,569,576
REARVIEW MIRROR ARRANGEMENT
Filed May 6, 1950
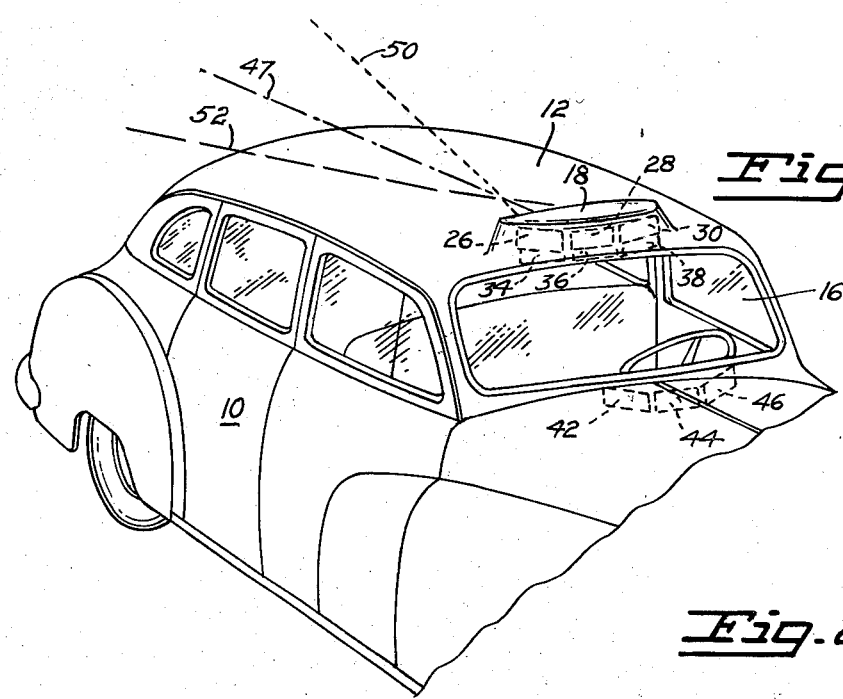
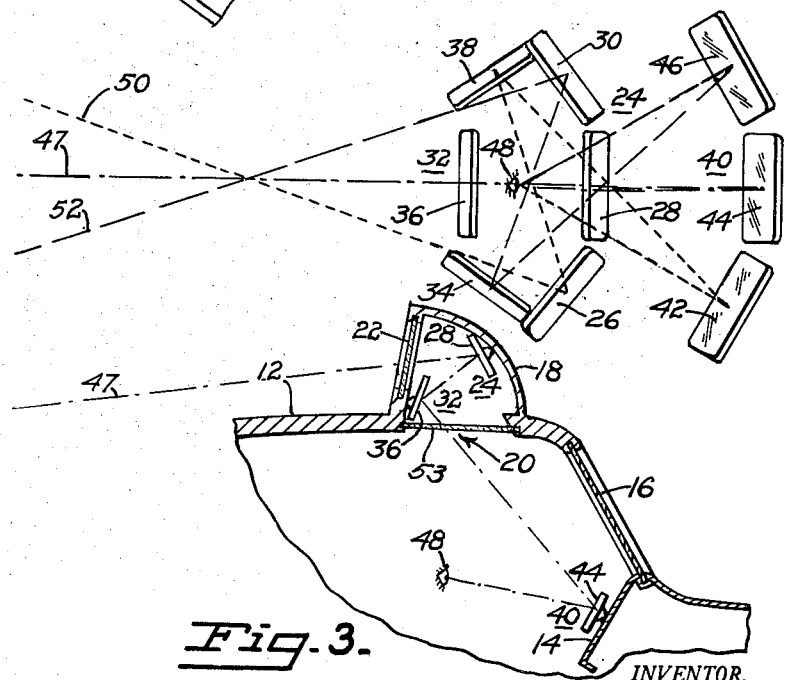
INVENTOR.
CLARENCE RAMME
BY Bruce & Brosler
HIS ATTORNEYS Patented Oct. 2, 1951

2,569,576

UNITED STATES PATENT OFFICE 2,569,576

REARVIEW MIRROR ARRANGEMENT

Clarence Ramme, Rodeo, Calif.

Application May 6, 1950, Serial No. 160,549

4 Claims. (Cl. 88—86)

This invention relates to rear-view mirror arrangements for automotive vehicles and, more particularly, to a new and improved mirror arrangement providing a panoramic view to the rear of such vehicles.

Single mirrors placed to either side of the operator adjacent a front door window, or centrally above the windshield, have been employed in attempts to provide the operator with a complete view rearwardly of his vehicle. However, such arrangements require an inordinate amount of effort, and produce considerable distraction on the part of the operator in order to obtain what is at best only a fragmental rear view. The advantages of a device which would provide a full and complete panoramic view rearwardly of a vehicle at a single glance are, therefore, obvious; the distraction of the operator being lessened and safe operation of the vehicle being facilitated with an attendant lessening of fatigue for the operator.

Among the objects of the invention are the following:

(1) To supply a new and improved mirror arrangement which provides the operator of a vehicle with a wide-angle panoramic view rearwardly of the vehicle;

(2) To provide a new and improved wide-angle panoramic rear-view mirror arrangement for an automotive vehicle which necessitates but a minimum of distraction on the part of the operator;

(3) To provide the operator of a vehicle, by means of a new and improved mirror arrangement, with a wide-angle rearward panoramic view in a highly-condensed field, conveniently located;

(4) To provide the operator of a vehicle with a rapid and complete wide-angle panoramic view rearwardly of the vehicle.

The means for accomplishing these and other objects of the invention will become apparent from the following description taken in conjunction with the accompanying drawings, of which—

Figure 1 is a three-dimensional view of a vehicle incorporating the new and improved mirror arrangement of the invention;

Figure 2 is an idealized diagrammatic plan view of a mirror arrangement in accordance with the invention;

Figure 3 is a partial view of the vertical cross section taken along the longitudinal axial plane of the vehicle of Figure 1 and illustrating details of the mirror arrangement of the invention.

It is contemplated that the mirror arrangement of the invention may be employed with any vehicle, and particularly automotive vehicles, wherein an operator is required to maintain a close observation in one direction and is required to make an occasional inspection in the rearward direction prior to performing an operation such as turning in or out, passing, or changing lanes. With reference to Figure 1, such a vehicle, indicated generally at 10, may comprise at least a body or cab having a roof 12, a dashboard 14, and a windshield 16 disposed therebetween, with the operator's station within the cab and facing said windshield.

The vehicle is fitted to receive a rear-view mirror arrangement in accordance with the invention by providing a hood 18 positioned over an opening 20 which is located in said roof adjacent the upper edge of said windshield, which hood has a transparent window 22 facing rearwardly along the longitudinal axial plane of the vehicle.

The mirror arrangement of the invention comprises a first group 24 involving a right wing 26, as viewed from the operator's station, central wing 28, and left wing 30, mirror sections mounted interiorly along the front wall of the hood 18 and facing rearwardly through the window 22; a second group 32 comprising a right wing 34, central wing 36, and left wing 38, mirror sections mounted in a position below the horizontal plane of said first group of mirrors, and adjacent the rear boundary edge of the opening 20, such second group facing in a forward direction; and a third group 40 comprising right wing 42, central wing 44, and left wing 46, mirror sections mounted upon the dashboard adjacent the lower edge of the windshield and facing rearwardly. The various mirror sections may or may not be adjustably mounted. Preferably, only the dashboard mirror sections are so mounted for accommodation to operators of different heights.

Individual mirrors of said groups are positioned for proper operation as follows: Central mirror section 28, of said first group, is arranged to intercept light approaching from the rear within an angle symmetrically disposed with respect to the longitudinal axis of the vehicle as represented by the dot-dash line 47, and to reflect the intercepted light downwards and to the rear to central mirror section 36 of the second group, which in turn reflects the light downwards and forwardly to the central mirror section 44 of the third group, whence the light is reflected upwards and rearwardly to the eye 48 of the operator.

Right wing mirror section 26 of the first group is arranged to intercept light approaching from the rear within an angle symmetrical to the dotted line 50 which intersects the longitudinal axis line 47, and to reflect the intercepted light downwardly and rearwardly to the left wing mirror section 38 of said second group, from which it is reflected downwardly and forwardly to the ring wing mirror section 42 of said third group, and thence to the eye of the operator. Similarly, left wing mirror section 30 of said first group is arranged to intercept light approaching within an angle symmetrical to the dash line 52 which intersects the longitudinal axis line 47 preferably at the same point as line 50, and to reflect the intercepted light downward and rearward to the right wing mirror section 34 of said second group, from which it is reflected downward and forward to the left wing mirror section 46 of said third group, and thence to the eye of the operator.

With such a mirror arrangement the operator needs only to glance momentarily at the group of mirrors mounted on the dashboard to obtain complete information as to conditions rearwardly of the vehicle. No obstructions interfere with the view due to the arrangement and location of the first group of mirrors, and due to the double reversal of the image, the objects appearing therein will bear the same relationship to the vehicle as in a direct rear-view mirror.

Moreover, the height of these mirrors above the roadway yield a clear view over vehicles following closely behind; and headlight glare from vehicles behind is markedly reduced since these mirrors are considerably above the level of normal headlight beams.

Certain modifications may be made in the mirror arrangement indicated. A simpler arrangement providing a narrower angle of rear vision may be had by eliminating the one or both of the wing mirror sections of each group. More sections may be added to provide an even greater angle of rear vision, or the various sections might be contiguous to avoid any break in the panoramic view to be obtained. The last group of mirrors might also be located adjacent the upper edge of the windshield if space considerations permit.

In speaking of "a group of mirror sections," it is intended to include not only independent mirror sections, but also an arcuate mirror in which the functional equivalent of sections exists.

To minimize fogging of the window 22 and reduce probable accumulation of dust on the mirrors disposed within the hood 18, I prefer to close off the opening 20 by a sheet 53 of glass or plastic and create a dead air space within the hood, or such space may be evacuated of air.

While there has been disclosed in the foregoing what may be considered to be a preferred embodiment of the invention, it is believed that modifications may be made therein without departing from the spirit of the invention, and it is intended to cover all such as fall within the scope of the appended claims.

I claim:

1. A wide-angle rear-view mirror arrangement for an automotive vehicle having a roof, a dashboard and a windshield therebetween, said arrangement involving a first group of mirror sections disposed forwardly on said roof and including a central section facing along the longitudinal axis of said vehicle and left and right wing sections each facing rearwardly across said longitudinal axis; a second and corresponding group of mirror sections facing forwardly and disposed rearwardly and below said first group of mirror sections, the left wing section of said first group being tilted downwardly to direct reflected light through an opening in said roof to right wing section of said second group, the right wing section of said first group being tilted downwardly to direct reflected light through an opening in said roof to the left wing section of said second group, and the central section of said first group being tilted downwardly to direct reflected light to the central section of said second group; said second group of mirror sections being tilted downwardly to direct reflected light toward said dashboard; and a third and corresponding group of mirror sections disposed on said dashboard in the path of reflected light from said second group, the left section thereof being tilted upwardly to direct reflected light from the right section of said second group to the eye of an operator, the right section of said third group being tilted upwardly to reflect light from the left section of said second group to the eye of such operator, and the central section of said third group being tilted upwardly to reflect light from the central section of said second group to the eye of such operator.

2. A rear-view mirror arrangement for an automotive vehicle having a roof, a dashboard and a windshield between said roof and dashboard; said arrangement involving an opening in said roof adjacent the upper end of said windshield, a mirror involving a group of sections disposed above said roof and including a central section facing rearwardly along the longitudinal axis of such vehicle and a right wing section and a left wing section, each facing rearwardly across said longitudinal axis; a second mirror involving a corresponding group of mirror sections disposed adjacent the rear edge of said opening and at a lower elevation; the left wing sections of said first group being tilted downwardly to direct reflected light to the right wing section of said second group, the right wing section of said first group being tilted downwardly to direct reflected light to the left wing section of said second group, and the central section of said first group being tilted downwardly to direct reflected light to the central section of said second group; said second group of mirror sections being tilted downwardly to direct reflected light toward said dashboard; and a third mirror involving a corresponding group of mirror sections disposed on said dashboard in the path of reflected light from said second group, the left section thereof being tilted upwardly to reflect light from the right section of said second group to the eye of a driver, the right section of said third group being tilted upwardly to reflect light from the left section of said second group to the eye of such driver, and the central section of said third group being tilted upwardly to reflect light from the central section of said second group to the eye of such driver.

3. A rear-view mirror arrangement for an automotive vehicle having a roof, a dashboard and a windshield between said roof and dashboard, said arrangement involving an opening in said roof adjacent the upper end of said windshield, a hood covering said opening and with its interior open to the rear, a group of mirror sections disposed on the interior of the front wall of said hood and including a central section facing rearwardly along the longitudinal axis of such vehicle and a right wing section and a left wing section, each facing rearwardly across said longitudinal axis; a second and corresponding group of mirror sections disposed adjacent the rear edge of said opening and at a lower elevation; the left wing sections of said first group being tilted downwardly to direct reflected light to the right wing section of said second group, the right wing section of said first group being tilted downwardly to direct reflected light to the left wing section of said second group, and the central section of said first group being tilted downwardly to direct reflected light to the central section of said second group; said second group of mirror sections being tilted downwardly to direct reflected light toward said dashboard; and a third and corresponding group of mirror sections disposed on said dashboard in the path of reflected light from said second group, the left section thereof being tilted upwardly to reflect light from the right section of said second group to the eye of a driver, the right section of said third group being tilted upwardly to reflect light from the left section of said second group to the eye of such driver, and the central section of said third group being tilted upwardly to reflect light from the central section of said second group to the eye of such driver.

4. A rear-view mirror arrangement for an automotive vehicle having a roof, a dashboard and a windshield between said roof and dashboard, said arrangement involving an opening in said roof adjacent the upper end of said windshield, a hood covering said opening and with its interior open to the rear, a group of mirror sections disposed on the interior of the front wall of said hood and including a central section facing rearwardly along the longitudinal axis of such vehicle and a right ring section and a left wing section, each facing rearwardly across said longitudinal axis at a common point of intersection; a second and corresponding group of mirror sections disposed adjacent the rear edge of said opening and at a lower elevation, the left wing section of said first group being tilted downwardly to direct reflected light to the right wing section of said second group, the right wing section of said first group being tilted downwardly to direct reflected light to the left wing section of said second group, and the central section of said first group being tilted downwardly to direct reflected light to the central section of said second group; said second group of mirror sections being tilted downwardly to direct reflected light toward said dashboard; a third and corresponding group of mirror sections disposed on said dashboard in the path of reflected light from said second group, the left section thereof being tilted upwardly to reflect light from the right section of said second group to the eye of a driver, the right section of said third group being tilted upwardly to reflect light from the left section of said second group to the eye of such driver, and the central section of said third group being tilted upwardly to reflect light from the central section of said second group to the eye of such driver; and means for adjusting the tilt angle of each section of said third group independently of the others.

CLARENCE RAMME.

REFERENCES CITED

The following references are of record in the file of this patent:

UNITED STATES PATENTS

| Number | Name | Date |
| --- | --- | --- |
| 1,420,145 | Rees | June 20, 1922 |
| 1,643,420 | Porter | Sept. 27, 1927 |
| 2,252,161 | Borba | Aug. 12, 1941 |